(12) United States Patent
Chou et al.

(10) Patent No.: US 11,061,507 B2
(45) Date of Patent: Jul. 13, 2021

(54) TOUCH SYSTEM AND METHOD FOR CONTROLLING THE TOUCH SYSTEM BY VARYING FREQUENCIES OF ALTERNATING CURRENT SHIELDING SIGNALS AND TRANSMITTING SIGNALS OVER TIME

(71) Applicant: ITE Tech. Inc., Hsinchu (TW)

(72) Inventors: Yi-Chung Chou, Taipei (TW); Hsu-Min Chen, Hsinchu (TW); Ta-Wei Liu, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 0 days.

(21) Appl. No.: 16/684,501

(22) Filed: Nov. 14, 2019

(65) Prior Publication Data

US 2021/0041981 A1  Feb. 11, 2021

(30) Foreign Application Priority Data

Aug. 6, 2019 (TW) ................................ 108127869

(51) Int. Cl.
*G06F 3/041* (2006.01)
*G06F 16/22* (2019.01)

(52) U.S. Cl.
CPC ........ *G06F 3/0418* (2013.01); *G06F 16/2282* (2019.01); *G06F 2203/04107* (2013.01)

(58) Field of Classification Search
CPC ............... G06F 3/0418; G06F 16/2282; G06F 2203/04107
See application file for complete search history.

(56) References Cited

U.S. PATENT DOCUMENTS

| 2014/0152621 | A1* | 6/2014 | Okayama | ............... | G06F 3/0446 345/174 |
| 2016/0246445 | A1* | 8/2016 | Tang | ....................... | G06F 3/044 |
| 2017/0024081 | A1* | 1/2017 | Fang | ....................... | H04B 17/27 |

* cited by examiner

*Primary Examiner* — David D Davis
(74) *Attorney, Agent, or Firm* — Winston Hsu

(57) ABSTRACT

A method for controlling a touch system capable of reducing electromagnetic interference includes generating a first transmitting signal with a first frequency and a first alternating current shielding signal with the first frequency, transmitting the first transmitting signal to a first scan line of a plurality of scan lines of a touch panel, transmitting the first alternating current shielding signal to the plurality of scan lines exclusive of the first scan line, generating a second transmitting signal with a second frequency and a second alternating current shielding signal with the second frequency, transmitting the second transmitting signal to a second scan line of the plurality of scan lines, and transmitting the second alternating current shielding signal to the plurality of scan lines exclusive of the second scan line.

14 Claims, 5 Drawing Sheets

TOUCH SYSTEM AND METHOD FOR CONTROLLING THE TOUCH SYSTEM BY VARYING FREQUENCIES OF ALTERNATING CURRENT SHIELDING SIGNALS AND TRANSMITTING SIGNALS OVER TIME

BACKGROUND OF THE INVENTION

1. Field of the Invention

The present invention illustrates a touch system and a method for controlling the touch system capable of reducing electromagnetic interference, and more particularly, a touch system and a method for controlling the touch system by varying frequencies of the alternating current shielding signals and transmitting signals over time.

2. Description of the Prior Art

With the developments of technologies, various touch panels and touch screens have also been applied in our daily life. For example, the touch panel is capable of detecting coordinates of at least one touch point by using a self-capacitance detection technology or a mutual-capacitance detection technology. In general, when the touch panel is touched by a finger, capacitance values of a scan line in an X-axis direction and a scan line in a Y-axis direction are varied. Therefore, coordinates of a position of the touch point can be acquired by detecting an intersection position of two perpendicular scan lines.

In current self-capacitance detection technologies, in order to increase detection accuracy, an alternating current shielding signal can be used for avoiding generations of parasitic capacitors between different scan lines and a senor. In practice, when the touch panel uses a transmitting signal for detecting if a capacitance value of a certain scan line is varied, the alternating current shielding signal can be transmitted to remaining scan lines of the touch panel. Since a waveform of the alternating current shielding signal and a waveform of the transmitting signal can be identical, cross-voltages of all parasitic capacitors of the scan lines can be decreased. When the cross-voltages of all parasitic capacitors of the scan lines are decreased, the detection accuracy of the touch panel can be slightly increased.

However, in the current self-capacitance detection technologies, a frequency of the transmitting signal is a constant. Moreover, a frequency of the alternating current shielding signal and the frequency of the transmitting signal are identical. Therefore, when the touch panel performs a touch detection process, power of the transmitting signal and power of the alternating current shielding signal are centrally distributed at a certain frequency for a long time. However, a concentration of power at the certain frequency for a long time may generate harmonic waveforms having high-ordered frequencies in a power spectrum domain. In other words, in the current self-capacitance detection technologies, since a power distribution of all electromagnetic signals used in the touch panel is centralized at the certain frequency for a long time, electromagnetic interference caused by the harmonic waveforms having high-ordered frequencies is unavoidable, thereby decreasing the detection accuracy.

SUMMARY OF THE INVENTION

In an embodiment of the present invention, a method for controlling a touch system capable of reducing electromagnetic interference is disclosed. The method is illustrated as follows. First frequency data is generated by a frequency selector during a first time interval. A first transmitting signal having a first frequency is generated according to the first frequency data. The first transmitting signal having the first frequency is transmitted to a first scan line of a plurality of scan lines of a touch panel. A first alternating current shielding signal having the first frequency is generated according to the first frequency data. The first alternating current shielding signal having the first frequency is transmitted to the plurality of scan lines exclusive of the first scan line. Second frequency data is generated by the frequency selector during a second time interval. A second transmitting signal having a second frequency is generated according to the second frequency data. The second transmitting signal having the second frequency is transmitted to a second scan line of the plurality of scan lines of the touch panel. A second alternating current shielding signal having the second frequency is generated according to the second frequency data. The second alternating current shielding signal having the second frequency is transmitted to the plurality of scan lines exclusive of the second scan line. The first frequency and the second frequency are different. The first scan line and the second scan line are different.

In another embodiment of the present invention, a touch system is disclosed. The touch system comprises a touch panel and an integrated circuit. The touch panel is configured to detect a touch operation. The integrated circuit comprises a frequency selector, a transmitter, a receiver, an alternating current shielding signal generator, a channel selector, and a processor. The frequency selector is configured to generate frequency data. The transmitter is coupled to the frequency selector and configured to generate a plurality of transmitting signals. The receiver is coupled to the frequency selector and configured to receive a plurality of response signals. The alternating current shielding signal generator is coupled to the frequency selector and configured to generate a plurality of alternating current shielding signals. The channel selector is coupled to the transmitter, the receiver, and the alternating current shielding signal generator and configured to transmit the plurality of transmitting signals and the plurality of alternating current shielding signals to corresponding scan lines of the touch panel. The processor is coupled to the frequency selector, the transmitter, the receiver, the alternating current shielding signal, and the channel selector and configured to control the frequency selector, the transmitter, the receiver, the alternating current shielding signal, and the channel selector. The frequency selector generates first frequency data during a first time interval. The transmitter generates a first transmitting signal having a first frequency according to the first frequency data, and transmits the first transmitting signal having the first frequency to a first scan line of a plurality of scan lines of the touch panel through the channel selector. The alternating current shielding signal generator generates a first alternating current shielding signal having the first frequency according to the first frequency data. The first alternating current shielding signal having the first frequency is transmitted to the plurality of scan lines exclusive of the first scan line by using the channel selector. The frequency selector generates second frequency data during a second time interval. The transmitter generates a second transmitting signal having a second frequency according to the second frequency data, and transmits the second transmitting signal having the second frequency to a second scan line of the plurality of scan lines of the touch panel through the channel selector. The alternating current shielding signal generator generates a second alternating current shielding signal having the second frequency according to the second frequency data. The second alternating current shielding signal having the second frequency is transmitted to the plurality of scan lines exclusive of the second scan line by using the channel selector. The first frequency and the second frequency are different. The first scan line and the second scan line are different.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
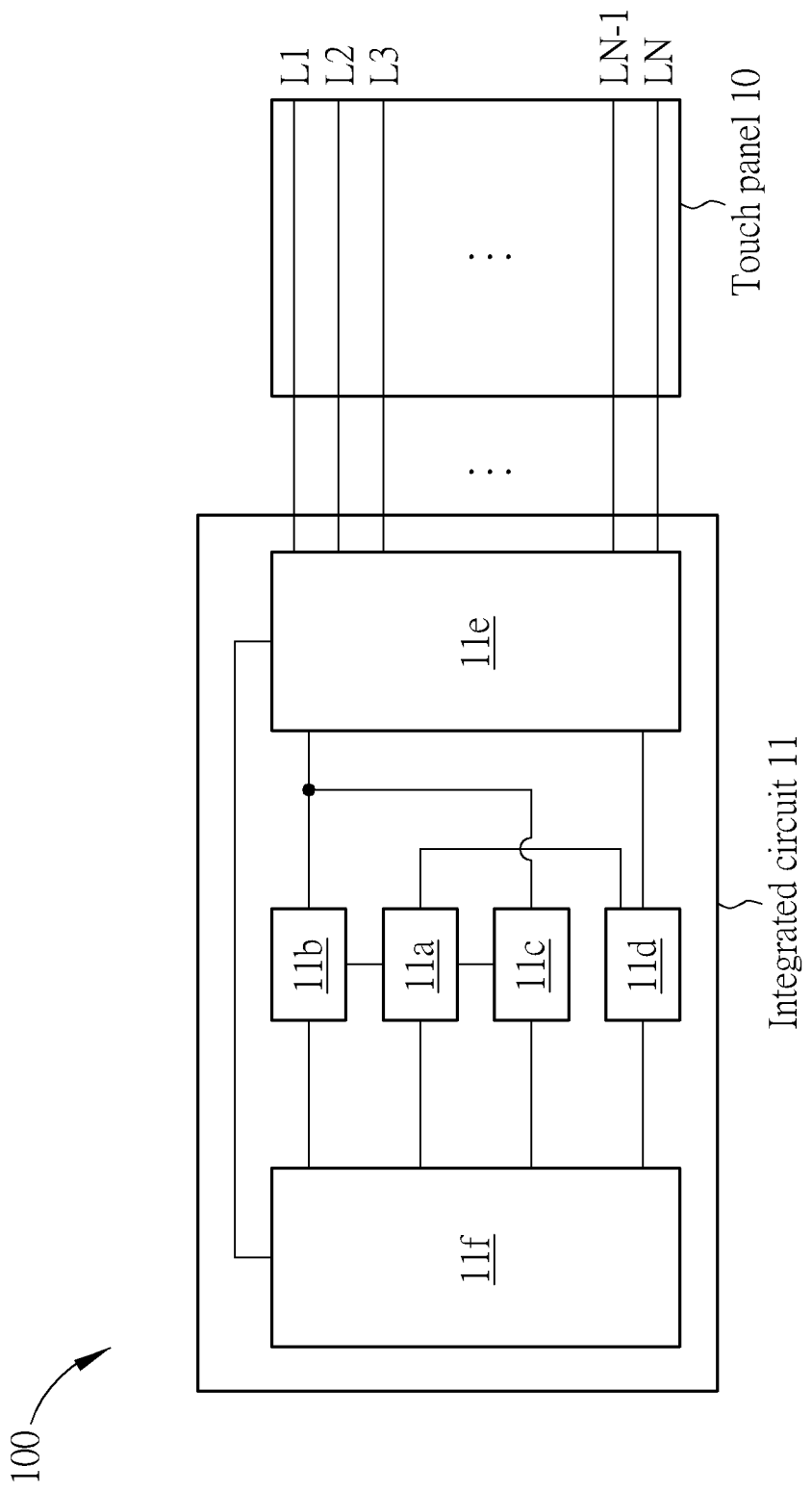
FIG. 1 is a block diagram of a touch system according to an embodiment of the present invention.

FIG. 1 is a block diagram of a touch system 100 according to an embodiment of the present invention. The touch system 100 includes a touch panel 10 and an integrated circuit 11. The touch panel 10 is used for detecting a touch operation. The touch panel 10 can be any device capable of performing a touch function, such as a screen of a tablet, a screen of a smartphone, or any touchpad. The touch panel 10 can detect coordinates of at least one touch point by using N scan lines L1 to LN. N is a positive integer greater than 2. The integrated circuit 11 includes a frequency selector 11a, a transmitter 11b, a receiver 11c, an alternating current shielding signal generator 11d, a channel selector 11e, and a processor 11f. The frequency selector 11a is used for generating frequency data. The frequency data may include a plurality of frequency values (i.e., such as 10K Hertz, 15K Hertz . . . ) and scan line indices corresponding to the plurality of frequency values. For example, a scan line L1 can be denoted as a channel CH1 for transmitting data at a frequency of 10K Hertz. A scan line L2 can be denoted as a channel CH2 for transmitting data at a frequency of 15K Hertz. Details of generating the frequency data are illustrated later. The transmitter 11b is coupled to the frequency selector 11a for generating a plurality of transmitting signals. The receiver 11c is coupled to the frequency selector 11a for receiving a plurality of response signals. The alternating current shielding signal generator 11d is coupled to the frequency selector 11a for generating a plurality of alternating current shielding signals. A waveform of each alternating current shielding signal and a waveform of a transmitting signal currently generated by the frequency selector 11a can be identical. The channel selector 11e is coupled to the transmitter 11b, the receiver 11c, and the alternating current shielding signal generator 11d for transmitting the plurality of transmitting signals and the plurality of alternating current shielding signals to corresponding scan lines of the touch panel 10. The processor 11f is coupled to the frequency selector 11a, the transmitter 11b, the receiver 11c, the alternating current shielding signal generator 11d, and the channel selector 11e for controlling the frequency selector 11a, the transmitter 11b, the receiver 11c, the alternating current shielding signal generator 11d, and the channel selector 11e. In the touch system 100, the processor 11f can be any computing device or any programmable device, such as a microprocessor, a central processing unit on a motherboard, or a processing chip. Any reasonable hardware modification falls into the scope of the present invention.

In the touch system 100, in order to reduce electromagnetic interference, power distributions of scan lines L1 to LN in the touch panel 10 are varied during different time intervals. Here, power of transmitting signals and power of alternating current shielding signals are not centrally distributed at the certain frequency for a long time. For example, the frequency selector 11a can generate first frequency data during a first time interval. The transmitter 11b can generate a first transmitting signal having a first frequency according to the first frequency data. Then, the transmitter 11b can transmit the first transmitting signal having the first frequency to the first scan line L1 of the plurality of scan lines L1 to LN of the touch panel 10 through the channel selector 11e. The alternating current shielding signal generator 11d can generate a first alternating current shielding signal having the first frequency according to the first frequency data. Then, the first alternating current shielding signal having the first frequency can be transmitted to the plurality of scan lines exclusive of the first scan line L1 (i.e., scan lines L2 to LN) by using the channel selector 11e. Further, the frequency selector 11a can generate second frequency data during a second time interval. The transmitter 11b can generate a second transmitting signal having a second frequency according to the second frequency data. Then, the transmitter 11b can transmit the second transmitting signal having the second frequency to the second scan line L2 of the plurality of scan lines L1 to LN of the touch panel 10 through the channel selector 11e. The alternating current shielding signal generator 11d can generate a second alternating current shielding signal having the second frequency according to the second frequency data. Then, the second alternating current shielding signal having the second frequency can be transmitted to the plurality of scan lines exclusive of the second scan line L2 (i.e., scan lines L1, and L3 to LN) by using the channel selector 11e, and so on. Further, in the touch system 100, the first frequency and the second frequency are different. The first scan line L1 and the second scan line L2 are different. A time length of the first time interval and the second time interval can be regarded as a processing time of scanning the first scan line L1 and the second scan line L2. Therefore, a processing time of scanning all scan lines L1 to LN can be regarded as a frame period. In other words, since the touch system 100 can change frequencies of transmitting signals and alternating current shielding signals during the frame period, the power of transmitting signals and the power of alternating current shielding signals are distributed at different frequencies during different time intervals. Therefore, since the power of transmitting signals and the power of alternating current shielding signals are not centrally distributed at the certain frequency for a long time, the touch system 100 can reduce the electromagnetic interference. Details of controlling the touch system 100 for reducing the electromagnetic interference are illustrated later.

Figure 2:
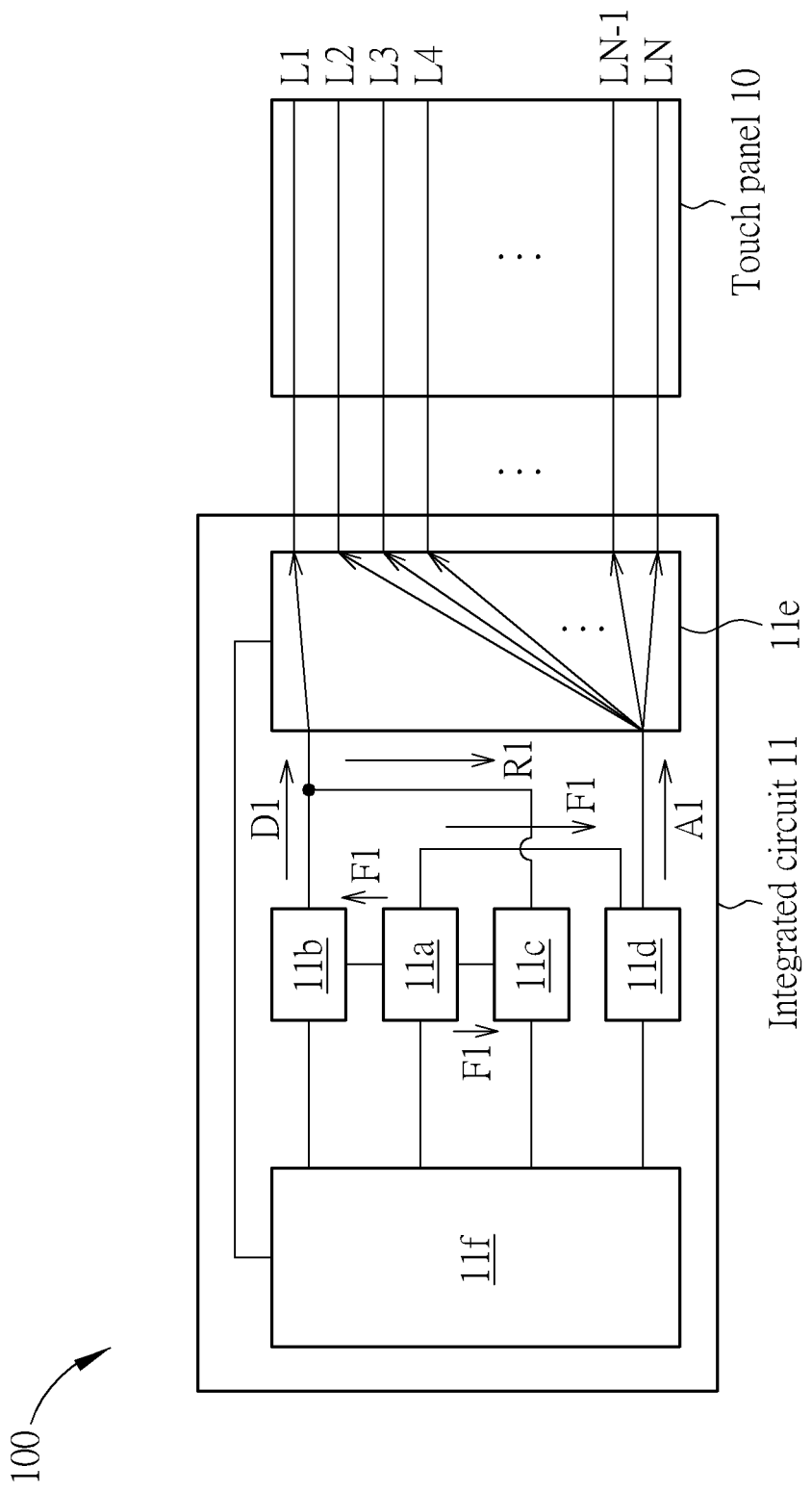
FIG. 2 is an illustration of performing signal communications during a first time interval of the touch system in FIG. 1.

FIG. 2 is an illustration of performing signal communications during the first time interval of the touch system 100. During the first time interval, the processor 11*f* can control the frequency selector 11*a* to generate the first frequency data F1. After the frequency selector 11*a* generates the first frequency data F1, the first frequency data F1 can be transmitted to the transmitter 11*b*, the receiver 11*c*, and the alternating current shielding signal generator 11*d*. After the transmitter 11*b* receives the first frequency data F1, the first transmitting signal D1 can be generated. The first transmitting signal D1 has the first frequency, such as 10K Hertz. The processor 11*f* can control the channel selector 11*e* for transmitting the first transmitting signal D1 to the first scan line L1. Therefore, the first transmitting signal D1 carried by the first scan line L1 has the first frequency. After the first frequency data F1 is received by the receiver 11*c*, the receiver 11*c* can adjust a receiving frequency to match with the first frequency according to the first frequency data F1 for preparing to receive a first response signal R1 having the first frequency generated by the touch panel 10. After the first response signal R1 is received by the receiver 11*c*, the receiver 11*c* can transmit the first response signal R1 to the processor 11*f* for performing a signal processing stage. After the first frequency data F1 is received by the alternating current shielding signal generator 11*d*, the alternating current shielding signal generator 11*d* can generate the first alternating current shielding signal A1. Here, a waveform of the first alternating current shielding signal A1 and a waveform of the first transmitting signal D1 are substantially identical. Therefore, the first alternating current shielding signal A1 has the first frequency. The processor 11*f* can control the channel selector 11*e* for transmitting the first alternating current shielding signal A1 to the scan lines L2 to LN. In other words, during the first time interval, the first transmitting signal D1 carried by the first scan line L1 of the touch panel 10 has the first frequency. The first alternating current shielding signal A1 carried by the scan lines L2 to LN of the touch panel 10 also has the first frequency. Moreover, after the touch panel 10 is touched, the first response signal R1 also has the first frequency. Therefore, total power of all signals of the touch system 100 is spectrally concentrated at the first frequency during the first time interval.

Figure 3:
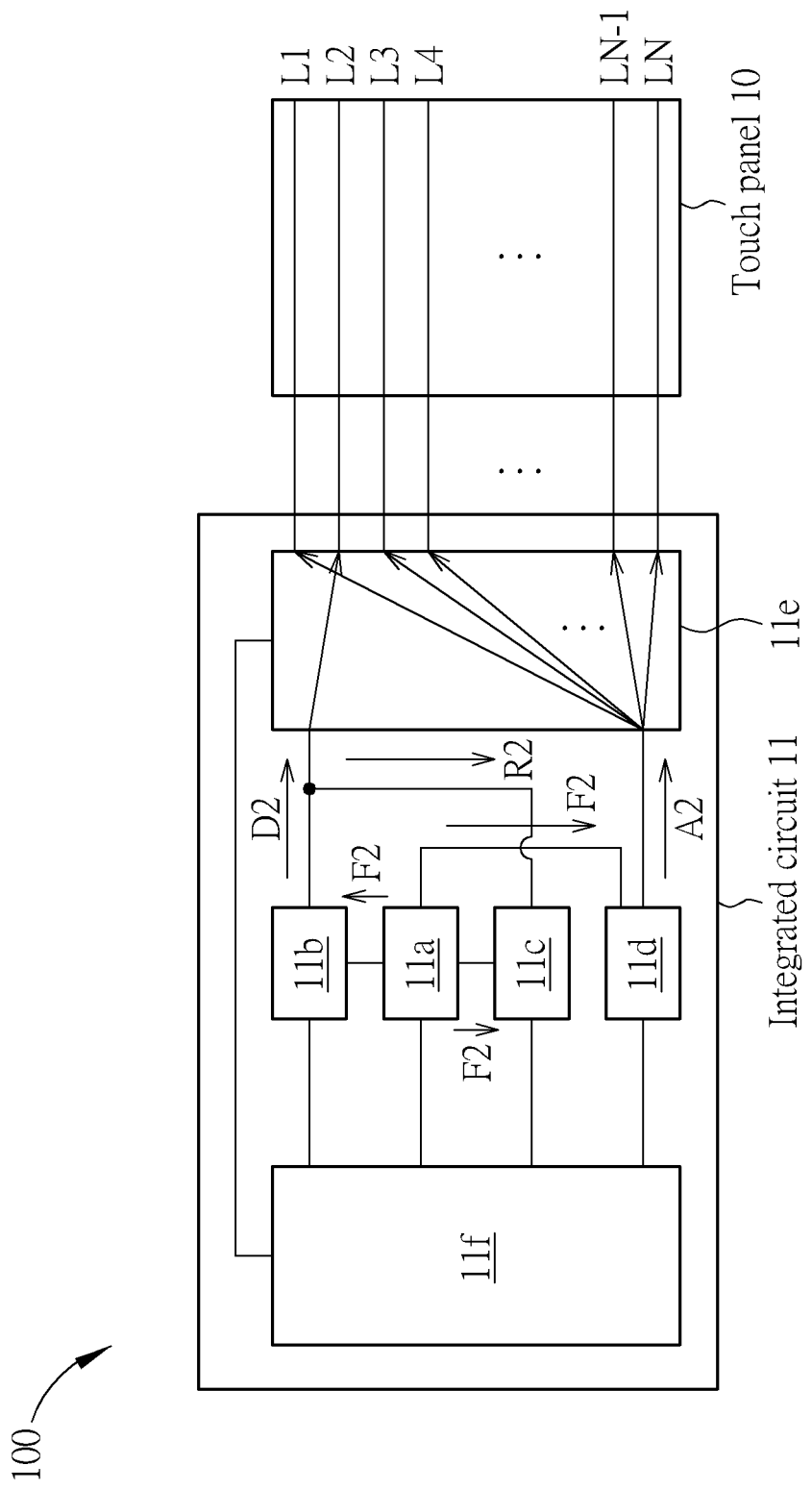
FIG. 3 is an illustration of performing signal communications during a second time interval of the touch system in FIG. 1.

FIG. 3 is an illustration of performing signal communications during the second time interval of the touch system 100. During the second time interval, the processor 11*f* can control the frequency selector 11*a* to generate the second frequency data F2. After the frequency selector 11*a* generates the second frequency data F2, the second frequency data F2 can be transmitted to the transmitter 11*b*, the receiver 11*c*, and the alternating current shielding signal generator 11*d*. After the transmitter 11*b* receives the second frequency data F1, the second transmitting signal D2 can be generated. The second transmitting signal D2 has the second frequency, such as 15K Hertz. The processor 11*f* can control the channel selector 11*e* for transmitting the second transmitting signal D2 to the second scan line L2. Therefore, the second transmitting signal D2 carried by the second scan line L2 has the second frequency. After the second frequency data F2 is received by the receiver 11*c*, the receiver 11*c* can adjust the receiving frequency to match with the second frequency according to the second frequency data F2 for preparing to receive a second response signal R2 having the second frequency generated by the touch panel 10. After the second frequency data F2 is received by the alternating current shielding signal generator 11*d*, the alternating current shielding signal generator 11*d* can generate the second alternating current shielding signal A2. Here, a waveform of the second alternating current shielding signal A2 and a waveform of the second transmitting signal D2 are substantially identical. Therefore, the second alternating current shielding signal A2 has the second frequency. The processor 11*f* can control the channel selector 11*e* for transmitting the second alternating current shielding signal A2 to the scan lines L1 and L3 to LN. In other words, during the second time interval, the second transmitting signal D2 carried by the second scan line L2 of the touch panel 10 has the second frequency. The second alternating current shielding signal A2 carried by the scan lines L1 and L3 to LN of the touch panel 10 also has the second frequency. Moreover, after the touch panel 10 is touched, the second response signal R2 also has the second frequency. Therefore, total power of all signals of the touch system 100 is spectrally concentrated at the second frequency during the second time interval.

In FIG. 2 and FIG. 3, the second time interval follows the first time interval. Therefore, after a scanning process starts, total power of all signals (i.e., including the first transmitting signal D1, the first response signal R1, and the first alternating current shielding signal A1) of the touch system 100 are spectrally distributed at the first frequency during the first time interval. Then, after the first time interval elapses, total power of all signals (i.e., including the second transmitting signal D2, the second response signal R2, and the second alternating current shielding signal A2) of the touch system 100 are spectrally distributed at the second frequency during the second time interval. In other words, since the power of transmitting signals, the power of alternating current shielding signals, and the power of response signals are not centrally distributed at the certain frequency for a long time, harmonic waveforms having high-ordered frequencies can be avoided. Therefore, the touch system 100 can reduce the electromagnetic interference.

Figure 4:
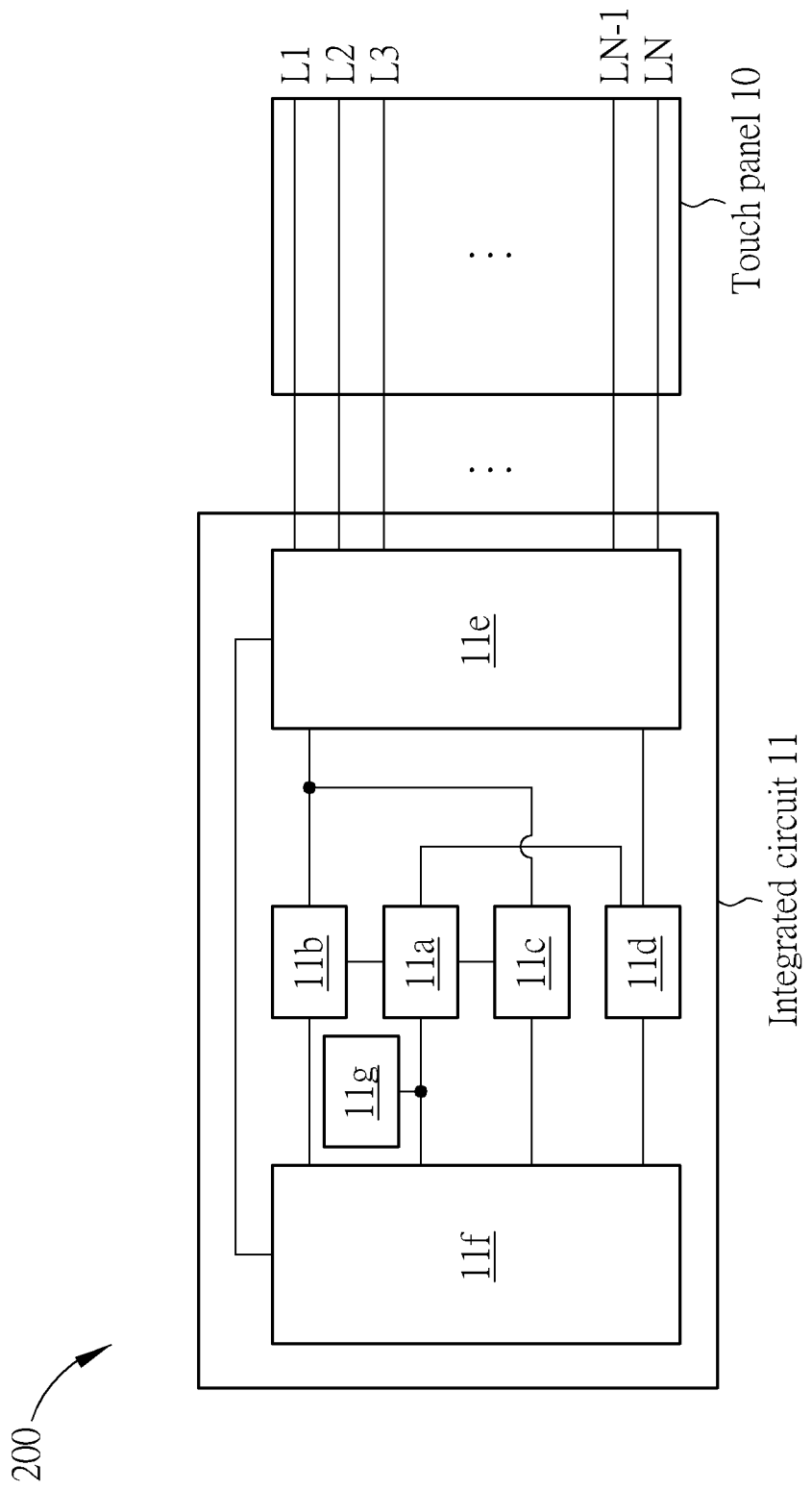
FIG. 4 is an illustration of introducing a programmable circuit to the touch system in FIG. 1.

FIG. 4 is an illustration of introducing a programmable circuit 11*g* to the touch system 100. For avoiding ambiguity, the touch system 100 including the programmable circuit 11*g* is called as a touch system 200 hereafter. In the touch system 200, the programmable circuit 11*g* can be a memory. The programmable circuit 11*g* is coupled to the frequency selector 11*a* for saving and accessing a query table. The query table can include a list of at least two frequency options and a list of at least two scan lines corresponding to the at least two frequency options. The query table can be illustrated as Table 1.

TABLE 1

| indices of scan lines (channel indices) | frequency configurations (the transmitting signal, the alternating current shielding signal, and the response signal) |
| --- | --- |
| 1 | freq1 |
| 2 | freq2 |
| . | . |
| . | . |
| . | . |
| N − 1 | freq1 |
| N | freq2 |

In Table 1, an index "1" of a channel corresponds to the first scan line L1. An index "2" of a channel corresponds to the second scan line L2, and so on. After the scanning process starts, the touch system 200 can alternately switch frequencies of the transmitting signal, the alternating current shielding signal, and the response signal during different time intervals according to Table 1. For example, a frequency denoted as "freq1" and a frequency denoted as "freq2" can be alternately switched for performing the scanning process in the touch system 200. In practice, the frequency selector 11a can use the query table for generating the first frequency data during the first time interval (i.e., the first time interval is defined as a processing time for scanning the first scan line L1 having the index "1"). The frequency selector 11a can use the query table for generating the second frequency data during the second time interval (i.e., the second time interval is defined as a processing time for scanning the second scan line L2 having the index "2"), and so on. However, contents of the query table are not limited to Table 1. Any reasonable technology for processing frequency variations of the transmitting signal, the alternating current shielding signal, and the response signal falls into the scope of the present invention.

The programmable circuit 11g can be a random number generator for generating a random number sequence. First, the touch system 200 can predetermine a plurality of candidate frequencies, such as N1 frequencies. N1 is a positive integer greater than two. Then, the frequency selector 11a can randomly select the first frequency from the plurality of frequencies according to the random number sequence. Further, the frequency selector 11a can generate the first frequency data by pairing the first frequency to the first scan line L1. After the first frequency is selected, the frequency selector 11a can randomly select the second frequency from the plurality of frequencies according to the random number sequence. Further, the frequency selector 11a can generate the second frequency data by pairing the second frequency to the second scan line L2, and so on. By doing so, after the scanning process starts, random frequency variations of the transmitting signal, the alternating current shielding signal, and the response signal can be introduced to the touch system 200 during different time intervals. Particularly, when the touch system 200 uses a random number sequence having very high randomness, the electromagnetic interference can be greatly reduced.

The programmable circuit 11g can be a counter for generating a sequentially ordered number sequence. Similarly, the touch system 200 can predetermine the plurality of candidate frequencies, such as the N1 frequencies. Then, the frequency selector 11a can select the first frequency and the second frequency sequentially from the plurality of frequencies according to the sequentially ordered number sequence. Further, the frequency selector 11a can generate the first frequency data by pairing the first frequency to the first scan line L1, and can generate the second frequency data by pairing the second frequency to the second scan line L2, and so on. In other words, frequencies of the transmitting signal, the alternating current shielding signal, and the response signal in the touch system 200 can be varied with time according to an order of the plurality of frequencies previously determined. Briefly, in the touch system 200, the frequencies of the transmitting signal, the alternating current shielding signal, and the response signal can be varied with time according to the query table, the random number sequence, a pseudo-random number sequence, the sequentially ordered number sequence, a result of software program, or any numerical algorithm.

Figure 5:
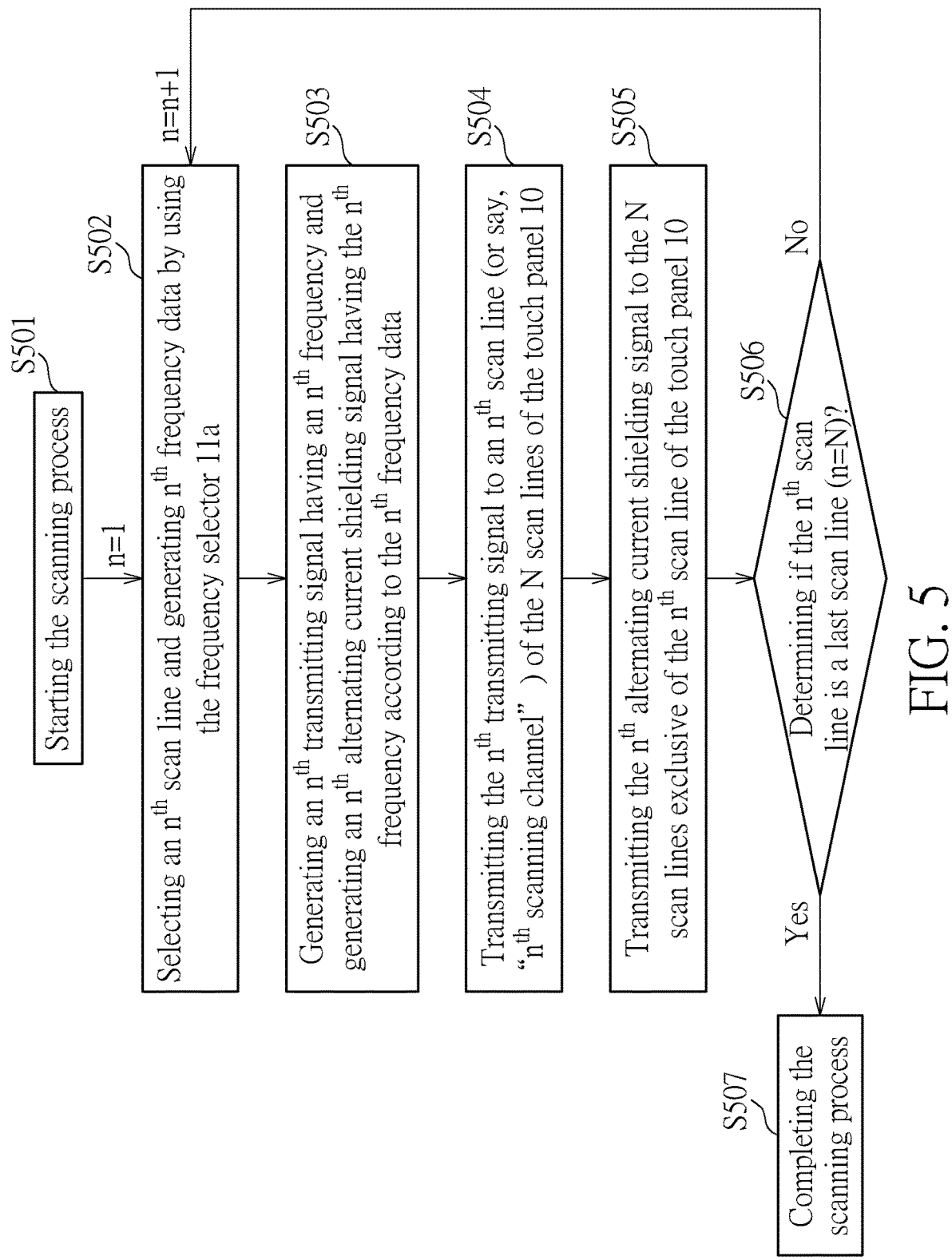
FIG. 5 is a flow chart of a method for controlling the touch system in FIG. 1 in order to reduce electromagnetic interference.

FIG. 5 is a flow chart of a method for controlling the touch system 100, 200 in order to reduce the electromagnetic interference. The method for controlling the touch system 100, 200 can include step S501 to step S507. Any reasonable technology modification falls into the scope of the present invention. Step S501 to step S507 are illustrated below.

step S501: starting the scanning process;

step S502: selecting an $n^{th}$ scan line and generating $n^{th}$ frequency data by using the frequency selector 11a;

step S503: generating an $n^{th}$ transmitting signal having an $n^{th}$ frequency and generating an $n^{th}$ alternating current shielding signal having the $n^{th}$ frequency according to the $n^{th}$ frequency data;

step S504: transmitting the $n^{th}$ transmitting signal to an $n^{th}$ scan line (or say, "$n^{th}$ scanning channel") of the N scan lines of the touch panel 10;

step S505: transmitting the $n^{th}$ alternating current shielding signal to the N scan lines exclusive of the $n^{th}$ scan line of the touch panel 10;

step S506: determining if the $n^{th}$ scan line is a last scan line; if so, executing step S507; if not, returning to step S502;

step S507: completing the scanning process.

Details of step S501 to step S507 are previously illustrated. Thus, they are omitted here. Step S502 to step S506 can be regarded as an $n^{th}$ scanning loop corresponding to the $n^{th}$ scan line. However, when all scan lines are scanned (i.e., n=N, N scanning loops are processed), the touch system 100, 200 can complete the scanning process according to step S507. Further, by performing step S501 to step S507, since frequencies of the N scanning loops are not completely identical, it implies that the power of transmitting signals, the power of alternating current shielding signals, and the power of response signals are not centrally distributed at the certain frequency for a long time. Therefore, the touch system 100, 200 can reduce the electromagnetic interference.

To sum up, the present invention discloses a touch system and a method for controlling the touch System capable of reducing electromagnetic interference. In order to reduce electromagnetic interference, power distributions of all scan lines in a touch panel are varied during different time intervals. The power distributions of transmitting signals and alternating current shielding signals are not centralized at a certain frequency in a power spectrum domain for a long time. In the touch system, frequencies of the transmitting signal and the alternating current shielding signal can be varied with time. In other words, the frequencies of the transmitting signal and the alternating current shielding signal are not fixed. In the touch system, since the power distributions of the transmitting signals and the alternating current shielding signals are not centralized at the certain frequency in the power spectrum domain for a long time, harmonic waveforms having high-ordered frequencies can be avoided. Thus, the electromagnetic interference can be reduced. By using the method for controlling the touch System of the present invention, when a scanning process is performed for detecting coordinates of at least one touch point, since the electromagnetic interference can be reduced, detection accuracy can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a touch system capable of reducing electromagnetic interference comprising:

generating first frequency data by a frequency selector during a first time interval;

generating a first transmitting signal having a first frequency according to the first frequency data;

transmitting the first transmitting signal having the first frequency to a first scan line of a plurality of scan lines of a touch panel;
generating a first alternating current shielding signal having the first frequency according to the first frequency data;
transmitting the first alternating current shielding signal having the first frequency to the plurality of scan lines exclusive of the first scan line;
generating second frequency data by the frequency selector during a second time interval;
generating a second transmitting signal having a second frequency according to the second frequency data;
transmitting the second transmitting signal having the second frequency to a second scan line of the plurality of scan lines of the touch panel;
generating a second alternating current shielding signal having the second frequency according to the second frequency data; and
transmitting the second alternating current shielding signal having the second frequency to the plurality of scan lines exclusive of the second scan line;
wherein the first frequency and the second frequency are different, and the first scan line and the second scan line are different.

2. The method of claim 1, further comprising:
generating a query table;
wherein the query table comprises a list of at least two frequency options and a list of at least two scan lines corresponding to the at least two frequency options, the frequency selector uses the query table for generating the first frequency data during the first time interval, and uses the query table for generating the second frequency data during the second time interval.

3. The method of claim 1, further comprising:
generating a random number sequence by using a random number generator;
randomly selecting the first frequency from a plurality of frequencies by the frequency selector according to the random number sequence;
generating the first frequency data by pairing the first frequency to the first scan line;
randomly selecting the second frequency from the plurality of frequencies by the frequency selector according to the random number sequence after the first frequency is selected; and
generating the second frequency data by pairing the second frequency to the second scan line.

4. The method of claim 1, further comprising:
generating a sequentially ordered number sequence by using a counter;
selecting the first frequency and the second frequency sequentially from a plurality of frequencies by the frequency selector according to the sequentially ordered number sequence;
generating the first frequency data by pairing the first frequency to the first scan line; and
generating the second frequency data by pairing the second frequency to the second scan line.

5. The method of claim 1, further comprising:
transmitting the first frequency data to a receiver after the first frequency data is generated by the frequency selector during the first time interval; and
adjusting a receiving frequency of the receiver to match with the first frequency according to the first frequency data for preparing to receive a first response signal having the first frequency generated by the touch panel.

6. The method of claim 1, further comprising:
transmitting the second frequency data to a receiver after the second frequency data is generated by the frequency selector during the second time interval; and
adjusting a receiving frequency of the receiver to match with the second frequency according to the second frequency data for preparing to receive a second response signal having the second frequency generated by the touch panel.

7. The method of claim 1, wherein the second time interval follows the first time interval, total power of the first alternating current shielding signal and the second alternating current shielding signal is spectrally distributed at the first frequency and the second frequency during the first time interval and the second time interval, and total power of the first transmitting signal and the second transmitting signal is spectrally distributed at the first frequency and the second frequency during the first time interval and the second time interval.

8. A touch system comprising:
a touch panel configured to detect a touch operation; and
an integrated circuit comprising:
  a frequency selector configured to generate frequency data;
  a transmitter coupled to the frequency selector and configured to generate a plurality of transmitting signals;
  a receiver coupled to the frequency selector and configured to receive a plurality of response signals;
  an alternating current shielding signal generator coupled to the frequency selector and configured to generate a plurality of alternating current shielding signals;
  a channel selector coupled to the transmitter, the receiver, and the alternating current shielding signal generator and configured to transmit the plurality of transmitting signals and the plurality of alternating current shielding signals to corresponding scan lines of the touch panel; and
  a processor coupled to the frequency selector, the transmitter, the receiver, the alternating current shielding signal, and the channel selector and configured to control the frequency selector, the transmitter, the receiver, the alternating current shielding signal, and the channel selector;
wherein the frequency selector generates first frequency data during a first time interval, the transmitter generates a first transmitting signal having a first frequency according to the first frequency data, and transmits the first transmitting signal having the first frequency to a first scan line of a plurality of scan lines of the touch panel through the channel selector, the alternating current shielding signal generator generates a first alternating current shielding signal having the first frequency according to the first frequency data, the first alternating current shielding signal having the first frequency is transmitted to the plurality of scan lines exclusive of the first scan line by using the channel selector, the frequency selector generates second frequency data during a second time interval, the transmitter generates a second transmitting signal having a second frequency according to the second frequency data, and transmits the second transmitting signal having the second frequency to a second scan line of the plurality of scan lines of the touch panel through the channel selector, the alternating current shielding signal generator generates a second alternating current shielding signal having the second frequency according to the second frequency data, the second alternating current shielding signal having the second frequency is transmitted to the plurality of scan lines exclusive of the second scan line by using the channel selector, the first frequency and the second frequency are different, and the first scan line and the second scan line are different.

9. The system of claim 8, further comprising:

a memory coupled to the frequency selector and configured to save a query table;

wherein the query table comprises a list of at least two frequency options and a list of at least two scan lines corresponding to the at least two frequency options, the frequency selector uses the query table for generating the first frequency data during the first time interval, and uses the query table for generating the second frequency data during the second time interval.

10. The system of claim 8, further comprising:

a random number generator coupled to the frequency selector and configured to generate a random number sequence;

wherein the frequency selector randomly selects the first frequency from a plurality of frequencies according to the random number sequence, generates the first frequency data by pairing the first frequency to the first scan line, randomly selects the second frequency from the plurality of frequencies according to the random number sequence after the first frequency is selected, and generates the second frequency data by pairing the second frequency to the second scan line.

11. The system of claim 8, further comprising:

a counter coupled to the frequency selector and configured to generate a sequentially ordered number sequence;

wherein the frequency selector selects the first frequency and the second frequency sequentially from a plurality of frequencies according to the sequentially ordered number sequence, generates the first frequency data by pairing the first frequency to the first scan line, and generates the second frequency data by pairing the second frequency to the second scan line.

12. The system of claim 8, wherein the frequency selector transmits the first frequency data to the receiver after the first frequency data is generated during the first time interval, the receiver adjusts a receiving frequency to match with the first frequency according to the first frequency data for preparing to receive a first response signal having the first frequency generated by the touch panel.

13. The system of claim 8, wherein the frequency selector transmits the second frequency data to the receiver after the second frequency data is generated during the second time interval, the receiver adjusts a receiving frequency to match with the second frequency according to the second frequency data for preparing to receive a second response signal having the second frequency generated by the touch panel.

14. The system of claim 8, wherein the second time interval follows the first time interval, total power of the first alternating current shielding signal and the second alternating current shielding signal is spectrally distributed at the first frequency and the second frequency during the first time interval and the second time interval, and total power of the first transmitting signal and the second transmitting signal is spectrally distributed at the first frequency and the second frequency during the first time interval and the second time interval.

* * * * *